(12) United States Patent
Jackson

(10) Patent No.: US 7,407,538 B2
(45) Date of Patent: Aug. 5, 2008

(54) IR TRANSPARENT INKJET INK SET

(75) Inventor: Christian Jackson, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 307 days.

(21) Appl. No.: 11/208,900

(22) Filed: Aug. 22, 2005

(65) Prior Publication Data

US 2006/0050120 A1   Mar. 9, 2006

Related U.S. Application Data

(60) Provisional application No. 60/608,348, filed on Sep. 8, 2004.

(51) Int. Cl.
*C09D 11/02* (2006.01)
*G01D 11/00* (2006.01)

(52) U.S. Cl. .................... 106/31.27; 106/31.6; 347/100

(58) Field of Classification Search ............. 106/31.27, 106/31.6; 347/100
See application file for complete search history.

(56) References Cited

U.S. PATENT DOCUMENTS

| 5,085,698 A | 2/1992 | Ma et al. |
| 5,093,147 A | 3/1992 | Andrus et al. |
| 5,336,174 A | 8/1994 | Daoud et al. |
| 5,423,432 A | 6/1995 | Krutak et al. |
| 5,461,136 A | 10/1995 | Krutak et al. |
| 5,990,197 A | 11/1999 | Escano et al. |
| 6,149,719 A | 11/2000 | Houle |
| 6,378,976 B1 | 4/2002 | Byers et al. |
| 2004/0100643 A1 | 5/2004 | Jones et al. |
| 2005/0235867 A1* | 10/2005 | Jackson et al. ............ 106/31.27 |
| 2006/0050119 A1* | 3/2006 | Jackson ...................... 347/100 |
| 2006/0103706 A1* | 5/2006 | Aikawa et al. .............. 347/100 |
| 2007/0109371 A1* | 5/2007 | Tomioka et al. ............... 347/86 |

FOREIGN PATENT DOCUMENTS

| EP | 0 992 551 | 4/2000 |
| WO | WO 2005/105936 | 11/2005 |

OTHER PUBLICATIONS

Patent Abstracts of Japan, vol. 1998, No. 06, Apr. 30, 1998, JP 10 044473.
Patent Abstracts of Japan, vol. 1999, No. 01, Jan. 29, 1999, JP 10 264416.
Patent Abstracts of Japan, vol. 2000, No. 25, Apr. 12, 2001, JP 2001 232825.

* cited by examiner

*Primary Examiner*—J. A Lorengo
*Assistant Examiner*—Veronica Faison-Gee

(57) ABSTRACT

The present invention pertains to an ink set comprising at least four different colored visible inks, for example BGMY, wherein none of the visible inks absorb significantly in the near infrared region (IR transparent).

15 Claims, No Drawings

IR TRANSPARENT INKJET INK SET

CROSS-REFERENCE TO RELATED APPLICATIONS

This application claims priority under 35 U.S.C. §119 from U.S. Provisional Application Ser. No. 60/608,348 (filed Sep. 8, 2004), the disclosure of which is incorporated by reference herein for all purposes as if fully set forth.

BACKGROUND OF THE INVENTION

The present invention pertains to an inkjet ink set and, more particularly, to a soluble colorant based ink set, comprising at least four differently colored visible inks, wherein none of the visible inks absorb significantly in the near infrared region (IR transparent).

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

There is commercial interest in providing intelligible markings on the surface of articles that are virtually invisible to the human eye, but which can be detected, for example, by a scanning device. Such markings can be used for authentication, sorting and other uses. It is further desirable to combine invisible markings with colored images and in particular colored images created by inkjet printing. The colored images preferably do not interfere with the detection of the invisible markings.

To create invisible markings, it is known to use near-infrared (IR) absorbing and infrared fluorescent compounds which have minimal light absorption in the visible light wavelength range of about 400-700 nm, and which have strong light absorbance in the near infrared wavelength region of about 700-900 nm. These compounds may also have accompanying fluorescence to produce fluorescent radiation having wavelengths longer than the wavelength of excitation. See, for example, U.S. Pat. Nos. 5,093,147, 5,336,174, 5,423,432 and 5,461,136, the disclosures of which are incorporated by reference herein for all purposes as if fully set forth. The infrared absorbance or fluorescence is detected by IR sensitive devices such as cameras and sensors.

Invisible infrared inks have been disclosed for ink jet printing. For example, U.S. Pat. No. 5,990,197 (the disclosure of which is incorporated by reference herein for all purposes as if fully set forth) discloses an organic solvent based polyester ink formulation having an infrared fluorescing compound suitable for ink jet printing.

To achieve full color images, ink jet printers typically employ a cyan, magenta and yellow ink (CMY ink set). These colors are known as subtractively-mixing primaries as light is subtracted as it passes through the colorant. These three colored inks can be used to print the entire range of hues. Inks sets commonly comprise, in addition, a black ink (CMYK ink set).

When used in combination with an IR absorbing/fluorescing marker, an ink set will preferably be non-absorbing (transparent) in the near-infrared region. Many magenta, yellow and black dyes commonly employed in current practice are satisfactorily transparent in this region of the spectrum. The notable exception is the cyan dye.

Cyan colored inkjet inks generally employ a copper phthalocyanine-based chromophore, for example, Direct Blue 199. Phthalocyanines, however, are widely known to absorb in the infrared (see, for example, *The Phthalocyanines*, Vol 1. Moser et al. CRC Press). At present, there are no practical alternative cyan chromophores that are sufficiently transparent in the near-IR region to be of use in marking applications with IR markers.

There is thus a need in the art, and it is an objective of this invention, to provide an inkjet ink set that can produce a full color gamut and that is substantially transparent in the near-IR region.

SUMMARY OF THE INVENTION

In accordance with an objective of this invention, there is provided an inkjet ink set comprising at least four colored visible inks, wherein the at least four colored visible inks comprise a first ink blue in color, a second ink green in color, a third ink magenta in color and a fourth ink yellow in color, wherein each of the first, second, third and fourth inks individually comprises a vehicle and a soluble colorant, and wherein the colored visible inks of the ink set are substantially transparent in the near-IR region (700-900 nm).

By "visible" is meant visible to the normal human eye (unaided).

Preferably, the inks of the ink set contain substantially no individual colorant that in and of itself is cyan in color and, more preferably, the ink set contains substantially no ink that is cyan in color. "Substantially" in this context does not exclude trace amounts of cyan colorant or cyan inks, but is especially preferred to have no cyan colorant or cyan ink.

The ink set may include one or more additional substantially near-IR transparent, colored, visible inks that are preferably other than cyan in color. In a preferred embodiment, the ink set further includes a black ink.

The inventive ink set is especially advantageous for use in combination with an invisible near-IR absorbing or fluorescing marking, as the invisible marking can still be detected through the colored inks.

The invisible markings can be applied by any suitable means. For example, invisible IR-detectable markings can applied to a substrate by traditional analog printing methods, and visible images can be applied by inkjet printing with the inventive ink set.

In a preferred embodiment, the inventive ink set further comprises a substantially colorless ink (invisible ink) with an IR-detectable marker, and invisible markings are digitally applied as part of the inkjet printing process with the inventive ink set.

The present invention further includes a method for ink jet printing onto a substrate, comprising the steps of:

(a) providing an ink jet printer that is responsive to digital data signals;

(b) loading the printer with a substrate to be printed;

(c) loading the printer with an inkjet ink set forth above; and (d) printing onto the substrate using the inkjet ink set in response to the digital data signals.

The substrate to be printed according to the inventive method can contain invisible markings that absorb or fluoresce in the near infrared, and which invisible markings remain detectable when underprinted and/or overprinted with the colored inks of the ink set.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Colored Inks

Colored visible inks in the ink set of the present invention comprise a vehicle, preferably an aqueous vehicle, and colorant soluble in the vehicle (dye).

Conventional dyes, such as anionic, cationic, amphoteric and non-ionic dyes, are useful in this invention. Such dyes are well known to those of ordinary skill in the art. Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

Anionic dyes include, for example, Acid, Direct, Food, Mordant and Reactive dyes. Classes of anionic dyes include nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds and indigoid compounds.

Cationic dyes include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds and oxazine compounds.

Whenever possible, dyes are referred to herein by their "C.I." designation established by Society Dyers and Colourists, Bradford, Yorkshire, UK and published in the *The Color Index*, Third Edition, 1971. That designation uses a perceived color as part of the name, but there is no formal spectral definition of what constitutes orange, red, violet, blue, green, etc. For the purposes of this invention, ink color (hue) will be named according to hue angle ranges as follows.

| Color | Hue Angle Range |
|---|---|
| Red | 10-70 |
| Yellow | 70-120 |
| Green | 120-180 |
| Cyan | 180-250 |
| Blue | 250-320 |
| Magenta | 320-10 |

In choosing colorants for an ink set, the hue angle for a given color preferably falls within the following ranges (between about x to about y).

| Color | Hue Angle Range |
|---|---|
| Red | 15-65 |
| Yellow | 75-110 |
| Green | 135-165 |
| Cyan | 195-230 |
| Blue | 265-305 |
| Magenta | 325-360 |

The hue angle is determined by spectrophotometric measurement of a solution or by printing an ink onto high quality inkjet media, such as photo paper, and measuring the color with a spectrometer. In the case where hue angle differs substantially between methods, the solution measurement should be preferred.

Dyes are selected for transparency in the near-IR region. By "substantially transparent in the near-IR region" is meant that a dye is substantially non-absorbing in the near-IR region of 700 to 900 nm. An IR transparent dye has sufficiently low background absorbance that it will not interfere with the detection of invisible IR absorbant/fluorescent markings. To the extent that absorbance information is not generally published or available for specific dyes, it can be readily determined by a person of ordinary skill in the art via routine measurement with a spectrophotometer.

"Substantially transparent in the near-IR region" in the context of the present invention does not exclude the presence of some absorption overlap of a colorant in the nearIR region but, again, the absorption should not be so much as to significantly interfere with the detection of invisible IR absorbant/fluorescent markings. The absorption of the colorants in the near-IR region is generally a "shoulder" from the peak in the visible, and colors with visible absorption at longer wavelengths (i.e. closer to 700 nm) have more of a problem with tail of the peak extending into the near-IR region. A soluble colorant (dye) can be useful in this invention if there is a broad region of relatively low absorption in the 700 to 900 nm range. For all points in the 850-900 nm region, the absorbance ratio of the colorants is preferably about 1% or less. For all points in the 800-900 nm range, the absorbance ratio is preferably about 2% or less, more preferably about 1.5% or less, and especially about 1% or less. For all points in the 750-900 nm range, and even more preferably for all points in the entire 700-900 nm range, the absorbance ratio is preferably less than about 7.5%, more preferably about 6.5% or less, still more preferably about 5% or less, and especially about 3% or less.

The absorbance ratio can be calculated from the measurement of the visible and near-IR spectrum of a colorant as an aqueous solution. The absorbance ratio is the absorbance at a point in the near-IR region divided by the absorbance at the maximum point in the visible region. The wavelength of maximum absorbance in the visible region will generally vary with each colorant. The absorbance ratio is expressed as percent (ratio multiplied by 100).

Useful dyes include (magenta) Acid Red 52, Reactive Red 180, Acid Red 37 and Reactive Red 23; (yellow) Direct Yellow 86, Direct Yellow 132 and Acid Yellow 23; (red) Reactive Orange 16, Reactive Red 123, Reactive Red 43, Reactive Orange 13, Acid Red 337 and Acid Red 415; (blue) Reactive Blue 49, Reactive Blue 19, Reactive Blue 72, Reactive Blue 21, Acid Blue 83 and Acid Blue 260; and (green) Reactive Green 12.

Inks may also be formed from a mixture of dyes, for example, a red ink may be a mixture of Reactive Red 180 and Reactive Yellow 84, and a green ink may be a mixture of Reactive Blue 72 and Reactive Yellow 85. The "dye content" in a given ink refers the total dye present in that ink, whether a single dye species or a combination of two or more dye species.

An ink set may also include a black ink. Useful black dyes include DK 31, DB 195, Food Black 2, AK 194 and AK 172.

Vehicle

The vehicle is a carrier for the colorant and can be aqueous or nonaqueous.

An "aqueous vehicle" refers to a vehicle comprised of water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

Inks based on aqueous vehicles can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

"Nonaqueous vehicle" refers a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tripropylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products.

Even when no water is deliberately added to the nonaqueous vehicle, some adventitious water may be carried into the formulation, but generally this will be no more than about 24%. By definition, the nonaqueous ink of this invention will have no more than about 10%, and preferably no more than about 5%, by weight of water based on the total weight of the nonaqueous vehicle.

Other Ingredients

Other ingredients may be formulated into an inkjet ink, to the extent that such other ingredients do not interfere with the stability and jetability of the ink, as well as the near-IR transparency of the colored inks, which may be readily determined by routine experimentation. Such other ingredients are in a general sense well known in the art.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'', N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Invisible Inks

An ink set can comprise an invisible ink. "Invisible" in this context means substantially invisible to the normal human eye (unaided), but detectable by absorbance or fluorescence in the near IR region.

Invisible inks in the context of the present invention comprise a vehicle and an IR marker.

Suitable vehicles (and optional components) are the same as set forth above for the colored inks.

The IR marker is generally, but not necessarily, a soluble dye. Infrared absorbing dyes include pentamethinecyanines, metal phthalocyanines, anthroquinone dyes, naphthoquinone dyes, dithiol and dithiene metal complexes, and squarylium dyes (see, for example Color Chemistry, Heinrich Zollinger VCN 1987). Examples of infrared-absorbing dyes in ink-jet inks are found in U.S. Pat. No. 6,378,976 and U.S. Pat. No. 6,149,719 (the disclosures of which are incorporated by reference herein for all purposes as if fully set forth), and previously incorporated U.S. Pat. No. 5,990,197.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, based on total weight of the ink.

The colorant (and IR marker) will generally be present in amounts up to about 12%, and more typically in the range of about 0.1 to about 9%, by weight of the total ink.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the application contemplated by this invention will generally require lower viscosity ink. Thus the viscosity (at 25° C.) of the inks can be less than about 7 cps; less than about 5 cps, and less than about 3.5 cps.

Ink Set

The term "ink set" refers to all the individual fluids an inkjet printer is equipped to jet. These fluids include all colored inks, all invisible inks and all non-colored inks. Non-colored (colorless) inks are inks with neither colorant nor IR detectable compound and are generally used to fix or enhance the durability of the colored inks or to enhance or equalize gloss.

A MYGB ink set can, for example, comprise:

a magenta ink comprising a first vehicle and a colorant selected from one or a combination of Acid Red 52, Reactive Red 180, Acid Red 37 and Reactive Red 23;

a yellow ink comprising a second vehicle and a colorant selected from one or a combination of Direct Yellow 86, Direct Yellow 132 and Acid Yellow 23;

a green ink comprising a third vehicle and a colorant selected from one or a combination of Reactive Green 12 and a (Reactive Blue 72/Reactive Yellow 85) mixture; and a blue ink comprising a fourth vehicle and a colorant selected from one or a combination of Reactive Blue 49, Reactive Blue 19, Reactive Blue 72, Reactive Blue 21, Acid Blue 83 and Acid Blue 260.

EXAMPLES

Measurements

Inks were printed using a Canon i550 printer onto Epson Premium Glossy Photo Paper. Color values were measured using a Greytag-Macbeth Spectrolino spectrometer.

The hue angle of a dye in solution was measured with a Hewlett Packard 8453 UV-Visible Spectrophotometer. The dye solution was diluted until the absorbance of the peak absorbance wavelength, lambda max, was between 0.4 and 0.8 absorbance units. The instrument software calculated the L*a*b*, hue and chroma values automatically from the measured spectrum.

Gamut volume was calculated according to methods described in U.S. 2004/0100643, the disclosure of which is incorporated by reference herein for all purposes as if fully set forth. The gamut volume is reported in thousands of L*a*b* units.

Preparation of Inks

Inks were prepared according to the following formulations. Ingredients were mixed together and filtered. Water was deionized. Surfynol® 465 is a surfactant from Air Products (Allentown, Pa., USA). Proxel® GXL is a biocide from Avecia (Wilmington, Del., USA).

| Ingredients | Ink C | Ink M | Ink Y | Ink B | Ink G |
|---|---|---|---|---|---|
| Direct Blue 199 | 1.8% | — | — | — | — |
| Reactive Red 180 | — | 2.0% | — | — | — |
| Acid Red 52 | — | 0.1% | — | — | — |
| Acid Yellow 23 | — | — | 1.6% | — | — |
| Reactive Blue 49 | — | — | — | 6.0% | — |
| Jettex ® Green 2GM (DyStar Corp.) | — | — | — | — | 4.0% |
| Glycerol | 8.5% | 8.5% | 8.5% | 8.5% | 8.5% |
| Surfynol ® 465 | 0.5% | 0.5% | 0.5% | 0.5% | 0.5% |
| Proxel ® GXL | 0.2% | 0.2% | 0.2% | 0.2% | 0.2% |
| Water | Bal. to 100% | Bal. to 100% | Bal. to 100% | Bal. to 100% | Bal. to 100% |
| Hue angle | 240 | 355 | 90 | 280 | 165 |

IR Transparency

The following results show the IR transparency of the colorants used in the Inks above plus some additional colorants. The visible and near infrared spectrum of was measured as an aqueous solution, and the absorbance ratio at various points was calculated. The absorbance ratio is the absorbance at a point in the near IR region divided by the absorbance at the maximum point in the visible region. The sample points in the near IR region were chosen to be 700, 750, 800 and 850 nm. The wavelength of maximum absorbance in the visible region varies with each colorant. The results summarized below are expressed as percent—a lower value indicates greater transparency.

| Colorant | A (700 nm)/ A (Max 400-700) | A (750 nm)/ A (Max 400-700) | A (800 nm)/ A (Max 400-700) | A (850 nm)/ A (Max 400-700) |
|---|---|---|---|---|
| DB 199 | 27.00% | 8.30% | 5.10% | 4.00% |
| RR 180/AR 52 20:1 wt. Ratio | 0.30% | 0.10% | 0.10% | 0.10% |
| AY 23 | 1.20% | 1.00% | 0.90% | 0.90% |
| RB 49 | 2.20% | 0.40% | 0.30% | 0.30% |
| Jettex ® Green 2GM | 19.50% | 3.10% | 0.90% | 0.90% |
| RG 12 | 21.90% | 6.50% | 1.20% | 0.20% |
| RB 19 | 3.60% | 0.60% | 0.00% | 0.00% |
| RK 31 | 4.90% | 2.60% | 1.20% | 0.90% |

The absorption of the colorants in the near-IR region is generally a "shoulder" from the peak in the visible, and colors with visible absorption at longer wavelengths (i.e. closer to 700 nm) have more of a problem with tail of the peak extending into the near-IR region. This can be seen for cyan (DB199) in the above data. The maximum IR absorption occurs at 700 nm and tails off at longer wavelengths, although for this particular colorant it never seems to hit a low baseline level. In contrast the magenta and yellow colorants show low baseline levels of IR absorption throughout. Other colorants start with an intermediate level of absorbance at 700 nm, but quickly recover to baseline levels at longer wavelengths.

An alternative method of evaluating IR transparency is provided in the following table. Here, the sum of the absorbance in the near IR is divided by the sum of the absorbance in the visible and the results expressed in percent. A lower value indicates greater transparency. Again the relative ranking of colorant for transparency is similar to the previous method.

|  | Sum A (700-900 nm)/ Sum A (400-700 nm) |
|---|---|
| DB 199 | 13.20% |
| RR 180/AR 52 (20:1 weight ratio) | 0.20% |
| AY 23 | 2.30% |
| RB 49 | 0.70% |
| Jettex ® Green 2GM | 5.00% |
| RG 12 | 1.60% |
| RB 19 | 0.20% |
| RK 31 | 5.10% |

Example 1

The color gamut volume of a BGMY ink set of the present invention was compared to a standard CYM ink set.

| Ink Set | Gamut Volume (L*a*b* units) |
|---|---|
| Comparative (Inks C, Y and M) | 448,000 |
| Inventive (Inks B, G, M and Y) | 503,000 |

The inventive ink set has a larger gamut volume than a comparable CMY set. Thus, using a BGMY ink set does not sacrifice gamut volume relative to a standard CYM ink set.

Example 2

The table below shows the chroma and hue values for areas printed with combinations of inks G and B. It can be seen that the hue angles in the cyan range (hue angle 180-250) can be achieved in combination with good chroma (although not as high as a true cyan ink). In other words, the combination of green and blue inks can compensate for the missing cyan ink. And because both of Inks G and B are substantially transparent in the near IR, the resulting cyan color is also IR transparent.

| Green Ink Coverage | Blue Ink Coverage | Chroma | Hue |
|---|---|---|---|
| 100% | 0% | 100 | 149 |
| 100% | 30% | 91 | 155 |
| 100% | 50% | 83 | 161 |
| 100% | 70% | 77 | 166 |
| 100% | 90% | 72 | 170 |
| 90% | 100% | 68 | 173 |
| 70% | 100% | 62 | 180 |
| 50% | 100% | 52 | 193 |
| 40% | 100% | 47 | 206 |
| 30% | 100% | 43 | 227 |
| 20% | 100% | 47 | 252 |
| 10% | 100% | 58 | 272 |
| 0% | 100% | 72 | 285 |

The invention claimed is:

1. An inkjet ink set comprising at least four visible inks, wherein the at least four visible inks comprise a first ink blue in color, a second ink green in color, a third ink magenta in color and a fourth ink yellow in color, wherein each of the first, second, third and fourth inks individually comprises a vehicle and a soluble colorant, and wherein the visible inks of the ink set are substantially transparent in the near-infrared region, wherein the inks of the ink set contain substantially no individual colorant that in and of itself is cyan in color.

2. The ink set of claim 1, wherein the ink set contains substantially no ink that is cyan in color.

3. The ink set of claim 1, wherein the blue ink has a hue angle of between 250 and 320; the green ink has a hue angle of between 120 and 180; the magenta ink has a hue angle of between 320 and 10; and the yellow ink has a hue angle of between 70 and 120.

4. The ink set of claim 1, wherein the colorants in the visible inks have an absorbance ratio in the 850-900 nm region of about 1% or less; and/or an absorbance ratio in the 800-900 nm region of about 2% or less; and/or an absorbance ratio in the 750-900 nm region of about 7.5% or less.

5. The ink set of claim 1, further comprising a fifth ink black in color comprising a vehicle and a black colorant.

6. The ink set of claim 1, wherein the vehicle of each ink in the ink set is, individually, an aqueous vehicle.

7. The ink set of claim 1, wherein the colorant in the first ink is selected from the group consisting of Reactive Blue 49, Reactive Blue 19, Reactive Blue 72, Reactive Blue 21, Acid Blue 83, Acid Blue 260 and combinations thereof; and/or the colorant in the second ink is selected from the group consisting of Reactive Green 12, a Reactive Blue 72/Reactive Yellow 85 mixture, and combinations thereof; and/or the colorant in the third ink is selected from Acid Red 52, Reactive Red 180, Acid Red 37, Reactive Red 23 and combinations thereof; and/or the colorant in the fourth ink is selected from the group consisting of Direct Yellow 86, Direct Yellow 132, Acid Yellow 23 and combinations thereof.

8. The ink set of claim 1, further comprising an invisible ink comprising a vehicle and an infrared marker.

9. A method for ink jet printing onto a substrate, comprising the steps of:
(a) providing an ink jet printer that is responsive to digital data signals;
(b) loading the printer with a substrate to be printed;
(c) loading the printer with an inkjet ink set; and
(d) printing onto the substrate using the inkjet ink set in response to the digital data signals,
wherein the inkjet ink set comprises at least four visible inks, wherein the at least four visible inks comprise a first ink blue in color, a second ink green in color, a third ink magenta in color and a fourth ink yellow in color, wherein each of the first, second, third and fourth inks individually comprises a vehicle and a soluble colorant, and wherein the visible inks of the ink set are substantially transparent in the near-infrared region, and wherein the inks of the ink set contain substantially no individual colorant that in and of itself is cyan in color.

10. The method of claim 9, wherein the substrate to be printed contains invisible markings that absorb or fluoresce in the near-infrared region, and which invisible markings remain detectable when overprinted with the visible inks of the ink set.

11. The method of claim 9, wherein the blue ink has a hue angle of between 250 and 320; the green ink has a hue angle of between 120 and 180; the magenta ink has a hue angle of between 320 and 10; and the yellow ink has a hue angle of between 70 and 120.

12. The method of claim 9, wherein the colorants in the visible inks have an absorbance ratio in the 850-900 nm region of about 1% or less; and/or an absorbance ratio in the 800-900 nm region of about 2% or less; and/or an absorbance ratio in the 750-900 nm region of about 7.5% or less.

13. The method of claim 9, wherein the ink set further comprises a fifth ink black in color comprising a vehicle and a black colorant.

14. The method of claim 9, wherein the colorant in the first ink is selected from the group consisting of Reactive Blue 49, Reactive Blue 19, Reactive Blue 72, Reactive Blue 21, Acid Blue 83, Acid Blue 260 and combinations thereof; and/or the colorant in the second ink is selected from the group consisting of Reactive Green 12, a Reactive Blue 72/Reactive Yellow 85 mixture, and combinations thereof; and/or the colorant in the third ink is selected from Acid Red 52, Reactive Red 180, Acid Red 37, Reactive Red 23 and combinations thereof; and/or the colorant in the fourth ink is selected from the group consisting of Direct Yellow 86, Direct Yellow 132, Acid Yellow 23 and combinations thereof.

15. The method of claim 9, wherein the ink set further comprises an invisible ink comprising a vehicle and an infrared marker.

* * * * *